US007316055B2

(12) United States Patent
Kinoshita et al.

(10) Patent No.: US 7,316,055 B2

(45) Date of Patent: Jan. 8, 2008

(54) MANUFACTURING METHOD OF NON-RECIPROCAL CIRCUIT DEVICE

(75) Inventors: Tsuyoshi Kinoshita, Tokyo (JP); Shunsuke Ideta, Tokyo (JP)

(73) Assignee: TDK Corporation, Tokyo (JP)

( * ) Notice: Subject to any disclaimer, the term of this patent is extended or adjusted under 35 U.S.C. 154(b) by 136 days.

(21) Appl. No.: 11/245,183

(22) Filed: Oct. 7, 2005

(65) Prior Publication Data

US 2006/0130318 A1 Jun. 22, 2006

(30) Foreign Application Priority Data

Oct. 8, 2004 (JP) ............................ 2004-297002

(51) Int. Cl.
*H01G 7/00* (2006.01)

(52) U.S. Cl. ......................... 29/25.42; 29/417; 29/607; 331/1.1; 331/24.2

(58) Field of Classification Search ............... 29/25.42, 29/417, 607; 331/1.1, 24.2
See application file for complete search history.

(56) References Cited

U.S. PATENT DOCUMENTS 5,774,024 A * 6/1998 Marusawa et al. ........... 333/1.1
5,923,224 A * 7/1999 Makino et al. .............. 333/1.1
5,945,887 A * 8/1999 Makino et al. .............. 333/1.1
6,020,793 A * 2/2000 Makino et al. .............. 333/1.1

FOREIGN PATENT DOCUMENTS

JP 11-97910 4/1999
JP 11-205001 7/1999

* cited by examiner

*Primary Examiner*—Paul D. Kim
(74) *Attorney, Agent, or Firm*—Oblon, Spivak, McClelland, Maier & Neustadt, P.C.

(57) ABSTRACT

A manufacturing method of producing a non-reciprocal circuit device, which is much smaller than a conventional counterpart, with excellent mass productivity. A support substrate having support portions arranged therein in a lattice-like form is produced, and a previously manufactured gyromagnetic component is bonded on each of the support portions. Then, a permanent magnet plate is bonded. The permanent magnet plate has a plane area which covers all the gyromagnetic components. Subsequently, the entire structure is cut in accordance with each gyromagnetic component.

2 Claims, 9 Drawing Sheets

MANUFACTURING METHOD OF NON-RECIPROCAL CIRCUIT DEVICE

BACKGROUND OF THE INVENTION

1. Field of the Invention

The present invention relates to a method of manufacturing a non-reciprocal circuit device such as an isolator or a circulator.

2. Description of the Related Art

A non-reciprocal circuit device such as an isolator or a circular is used in, e.g., a mobile wireless device such as a mobile phone. This type of non-reciprocal circuit device is configured to accommodate a gyromagnetic component constituted of a soft magnetic substrate, a center electrode and others, a permanent magnet, a matching capacitor(s) and a terminating resistance in a case functioning as a yoke and an insulator as typified by, e.g., Patent References 1 and 2.

The gyromagnetic component, the permanent magnet or the like and the case are independent components. Therefore, it is a conventional general technique to manufacture these components in different processes and then incorporate the gyromagnetic component, the permanent magnet and electric components such as a matching capacitor or a terminating resistance in the case, thereby producing a non-reciprocal circuit device.

Meanwhile, a reduction in size has been endlessly demanded for this type of non-reciprocal circuit device because of its marketability. As means for responding to a demand for a reduction in size, as disclosed in, e.g., Patent References 1 and 2, there has been proposed a configuration in which a square soft magnetic substrate is used in place of a discoid soft magnetic substrate, this substrate is accommodated in a case having a square inner space and a capacitor or a terminating resistor is accommodated in a very dense state by utilizing a space between the soft magnetic substrate and a case inner wall surface.

However, even if such a configuration as disclosed in Patent References 1 and 2 is adopted, the case has been conventionally considered to be an essential constituent part in order to assuredly couple central constituent parts such as a gyromagnetic component or a magnet with each other, and hence there is a limit in a reduction in size.

Further, after the gyromagnetic component, the permanent magnet or the like and the case are produced in different processes, the gyromagnetic component, the permanent magnet and electric components such as a matching capacitor or a terminating resistor must be incorporated in the case to manufacture a non-reciprocal circuit device, there is also a limit in an improvement of mass productivity.

Patent Reference 1: Japanese Patent Application Laid-open No. 1999-205011

Patent Reference 2: Japanese Patent Application Laid-open No. 1999-97910

SUMMARY OF THE INVENTION

It is an object of the present invention to provide a manufacturing method of producing a non-reciprocal circuit device, which has been considerably reduced in size as compared with a conventional counterpart, with excellent mass productivity.

To achieve of the object, in a manufacturing method of a non-reciprocal circuit device according to the present invention, gyromagnetic components are arranged on one surface of a support substrate. The support substrate comprises many support portions for non-reciprocal circuit devices which are arranged in a lattice-like pattern. Each of the gyromagnetic component is arranged in accordance with each support portion.

Then, a permanent magnet plate is arranged on a group of the gyromagnetic components. The permanent magnet plate has a plane area which covers all the gyromagnetic components.

Subsequently, the whole structure is cut along boundaries of the gyromagnetic components and the support portions, and each assembly including a support substrate, the gyromagnetic component and a permanent magnet is taken out.

That is, the support substrate in which many support portions are arranged in a lattice-like form is manufactured to improve efficiency of a manufacturing process of the support portions. Further, the gyromagnetic components and the permanent magnet plate are superimposed on this support substrate, then cutting processing is applied, and each assembly including the support substrate, the gyromagnetic component and the permanent magnet is individually taken out. Therefore, the mass productivity is greatly improved, thereby providing a small and inexpensive non-reciprocal circuit device.

Each assembly including the support substrate, the gyromagnetic component and the permanent magnet obtained by the present invention is integrated by using an adhesive or the like, and this assembly can be basically utilized as a non-reciprocal circuit device by just adding a yoke thereto. This means that a component such as a case which constrains the assembly including the support substrate, the gyromagnetic component and the permanent magnet is not required. In this case, both opposing side surfaces of the permanent magnet are exposed on cut surface, thereby determining a widthwise dimension of the entire non-reciprocal circuit device. This assembly does not have a case which has been conventionally considered as an essential component. According to this configuration, a size can be reduced without being restricted by the case.

As another conformation, a gyromagnetic component aggregate is superimposed on a support substrate. The support substrate has many support portions for non-reciprocal circuit devices arranged therein in a lattice-like form. The gyromagnetic component aggregate includes many gyromagnetic component elements arranged therein in a lattice-like form. Superimposition of the gyromagnetic component aggregate on the support substrate is performed in such a manner that each support portion corresponds to each gyromagnetic component element. Furthermore, a permanent magnet plate is arranged on the gyromagnetic component aggregate.

Then, the entire structure is cut along boundaries of the gyromagnetic component elements and the support portions, and each assembly including a support substrate, a gyromagnetic component and a permanent magnet is taken out.

The mass productivity is likewise improved by this manufacturing method, thereby providing a small and inexpensive non-reciprocal circuit device.

As described above, according to the present invention, it is possible to provide a manufacturing method of producing a non-reciprocal circuit device, which is smaller than a conventional counterpart, with excellent mass productivity.

The present invention will be more fully understood from the detailed description given here in below and the accompanying drawings which are given by way of illustration only, and thus are not to be considered as limiting the present invention.

DETAILED DESCRIPTION OF THE PREFERRED EMBODIMENTS

Figure 1:
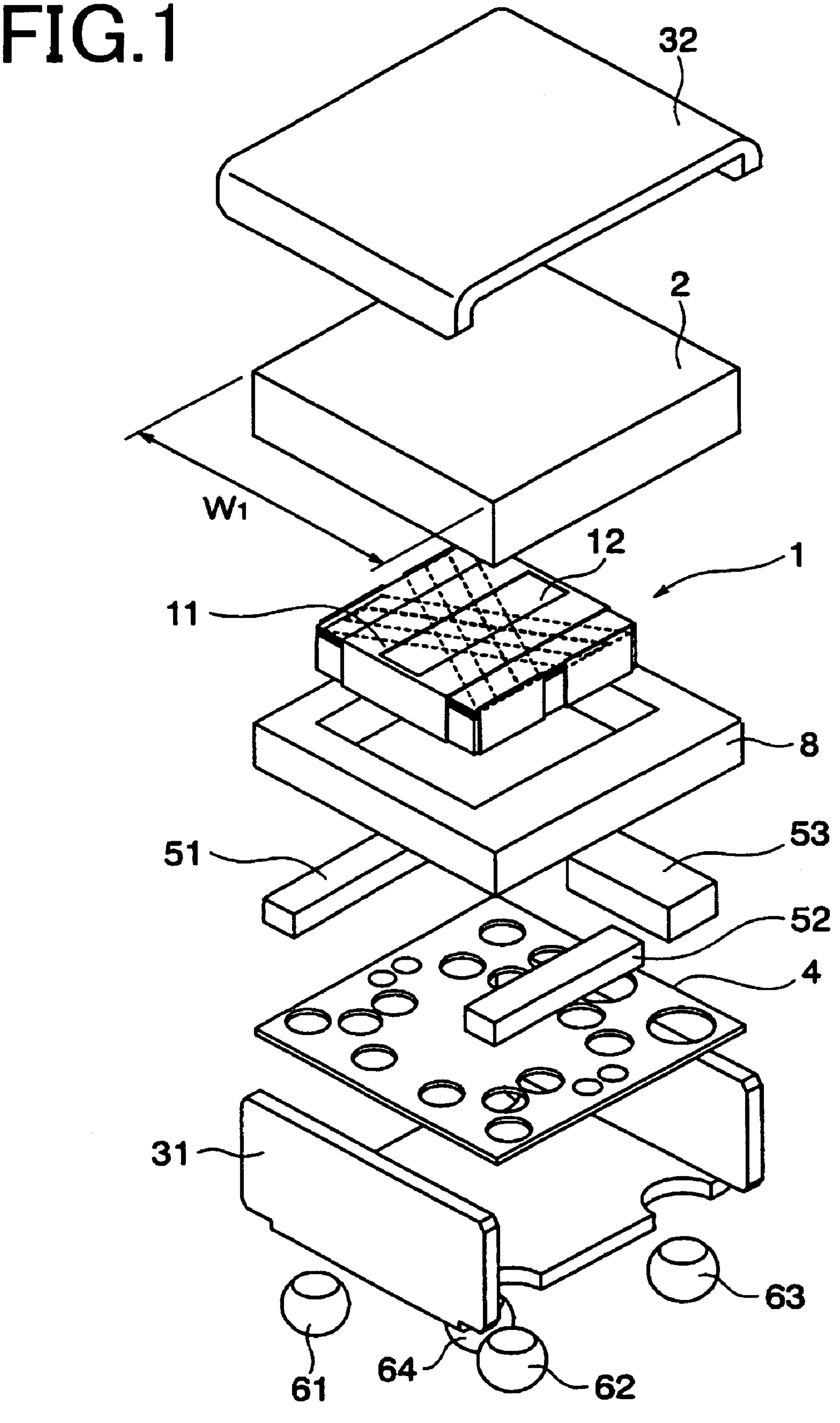
FIG. 1 is an exploded perspective view showing an example of a non-reciprocal circuit device manufactured by applying a manufacturing method according to the present invention.
Figure 2:
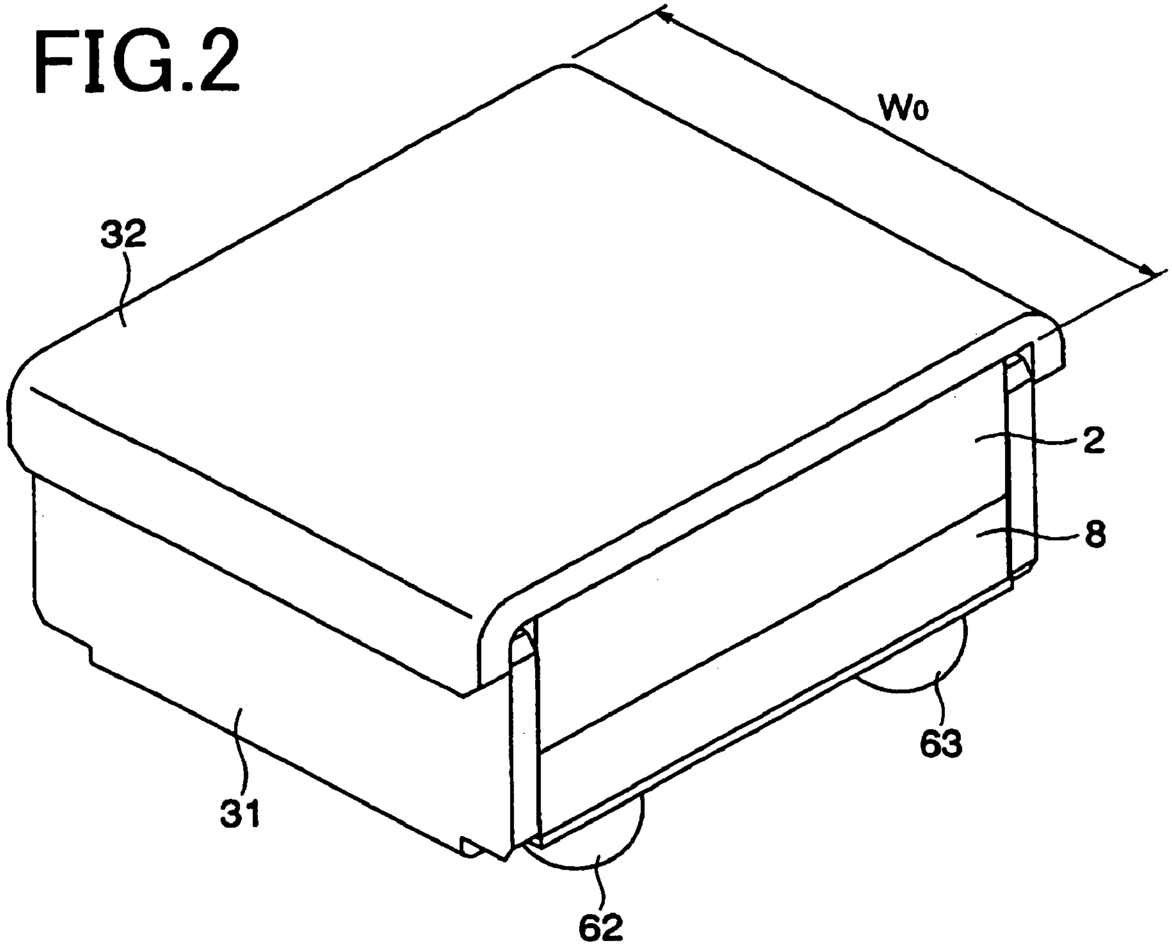
FIG. 2 is a perspective view of an assembling state of the non-reciprocal circuit device depicted in FIG. 1.
Figure 3:
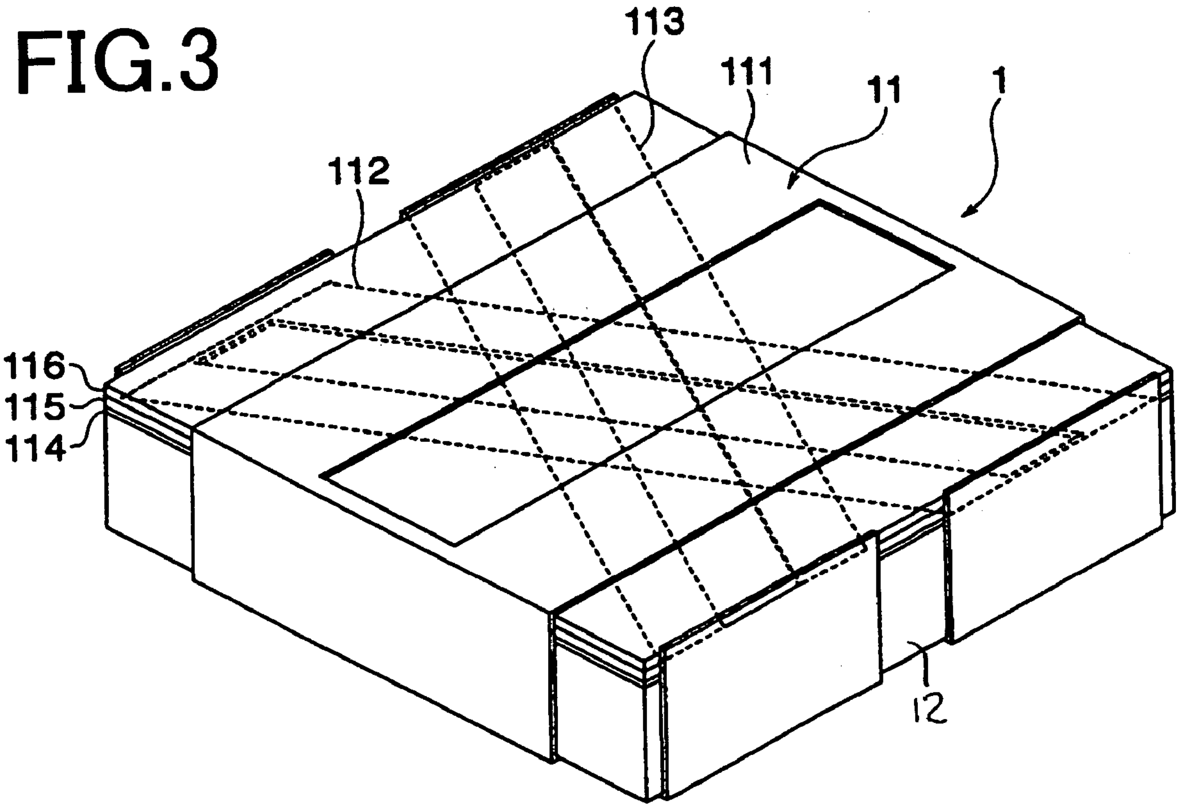
FIG. 3 is a perspective view of a gyromagnetic component.

Prior to explaining a manufacturing method according to the present invention, a non-reciprocal circuit device manufactured by this manufacturing method will be described. FIGS. 1 to 3 show an example of an isolator.

The illustrated non-reciprocal circuit device has a gyromagnetic component 1, a permanent magnet 2, a first yoke 31 and a second yoke 32 as its essential constituent parts. In the embodiment, it further has a support substrate 4, capacitors 51 and 52, a terminating resistor 53 and a plurality of metal balls 61 to 64 which serve as input/output terminals and ground terminals.

As shown in FIG. 3, the gyromagnetic component 1 includes a center electrode 11 and a soft magnetic substrate 12. The center electrode 11 includes first to third central conductors 111 to 113. The first to third central conductors 111 to 113 branch from three sides of a substantially square ground portion which is in contact with a lower surface of the soft magnetic substrate 12 in FIG. 3. The first to third central conductors 111 to 113 are provided through insulators 115 and 116 in such a manner that they cross each other at a predetermined angle on a main surface of the soft magnetic substrate 12. The third central conductor 113 positioned on the lowermost side is formed on an insulator 14 attached on the soft magnetic substrate 12.

For the soft magnetic substrate 12, a soft magnetic material (ferrite) such as yttrium/iron/garnet (YIG) is preferable. Although the soft magnetic substrate is not restricted to a specific shape, a square shape is preferable.

The permanent magnet 2 applies a direct-current magnetic field to the gyromagnetic component 1, and it is provided on one surface side of the gyromagnetic component 1 in the embodiment. However, the permanent magnet may be provided on both surface sides of the gyromagnetic component 1.

The first yoke 31 and the second yoke 32 constitute a magnetic path for a magnetic field generated by the permanent magnet 2. As a matter of course, each of the first yoke 31 and the second yoke 32 is formed of a magnetic material. Each of the first yoke 31 and the second yoke 32 in the embodiment is obtained by bending a magnetic metal sheet.

Again referring to FIGS. 1 and 2, an entire widthwise dimension W0 of the non-reciprocal circuit device is determined based on a widthwise dimension W1 of the permanent magnet 2. That is, both opposing side surfaces of the permanent magnet 2 are exposed on both opposing side surfaces of the non-reciprocal circuit device to determine the widthwise dimension W0 of the entire non-reciprocal circuit device. A case which has been conventionally considered as an essential component is not required for this structure. According to this configuration, a reduction in size can be realized without being restricted by the case.

Moreover, the entire widthwise dimension W0 between both the opposing side surfaces is determined based on the widthwise dimension W1 of the permanent magnet 2. In other words, both the opposing side surfaces of the permanent magnet 2 are exposed on both the opposing side surfaces of the non-reciprocal circuit device.

The first yoke 31 is led through side surfaces different from both the side surfaces on which the side surfaces of the permanent magnet 2 are exposed, i.e., side surfaces in a length direction. In the length direction, an increase in dimension due to a thickness of the yoke must be taken into consideration. However, the first yoke 31 can be formed of a tabular member, and hence an increase in thickness due to the first yoke 31 does not become a serious problem. Although the first yoke 31 has a shape in which both sides of a bottom plate thereof are raised, it is not necessarily restricted to such a shape.

The second yoke 32 is superimposed on the permanent magnet 2. Additionally, both ends of the second yoke 32 are coupled with the first yoke 31, thereby constituting a magnetic path for a magnetic field generated by the permanent magnet 2. Fixed coupling between the first yoke 31 and the second yoke 32 can be realized by mechanical coupling as well as joining using a solder.

The illustrated non-reciprocal circuit device further includes a support substrate 4, the gyromagnetic component 1 and the permanent magnet 2 are mounted on one surface of the support substrate 4, and the entire structure is constrained by using the first yoke 31 and the second yoke 32. According to this configuration, in the structure having no case, the permanent magnet 2, the gyromagnetic component 1 and the support substrate 4 can be assuredly constrained in a predetermined positional relationship, thereby obtaining predetermined characteristics.

An outer shape of the gyromagnetic component 1 described in the embodiment is smaller than that of the permanent magnet 2. When the outer shape of the gyromagnetic component 1 is smaller than that of the permanent magnet 2, there occurs a space due to a difference in outer shape between the gyromagnetic component 1 and the permanent magnet 2. It is preferable to fill this space with an insulating resin 8. By doing so, reliability is improved.

Further, in the embodiment, an outer shape of the support substrate 4 is matched with that of the permanent magnet 2. The outer shape of the support substrate 4 is substantially the same as that of the permanent magnet 2 and, when the gyromagnetic component 1 is arranged above the support substrate 4, a space corresponding to a difference in outer shape is generated between an outer periphery of the gyromagnetic component 1 and an outer periphery of the support substrate 4. The capacitors 51 and 52 and the terminating resistor 53 are arranged in the above-described space, secured to a conductor pattern formed on the support substrate 4 by soldering or the like, and further secured to a predetermined one of the central conductors 111 to 113 by means such as soldering so that a known circuit configuration can be obtained. Furthermore, the periphery is filled with the insulating resin 8. As shown in FIG. 1, all of the space does not have to be filled, and exposed surfaces alone may be filled with the insulating resin 8.

Moreover, an appropriate electrode is formed on the support substrate 4, and the metal balls 61 to 64 which serve as input/output terminals and ground terminals are attached by utilizing the electrode and the conductor pattern. The central conductors 111 to 113, the capacitors 51 and 52 and the terminating resistor 53 are connected with the metal balls 61 to 64 so that a predetermined electric circuit can be obtained.

Figure 4:
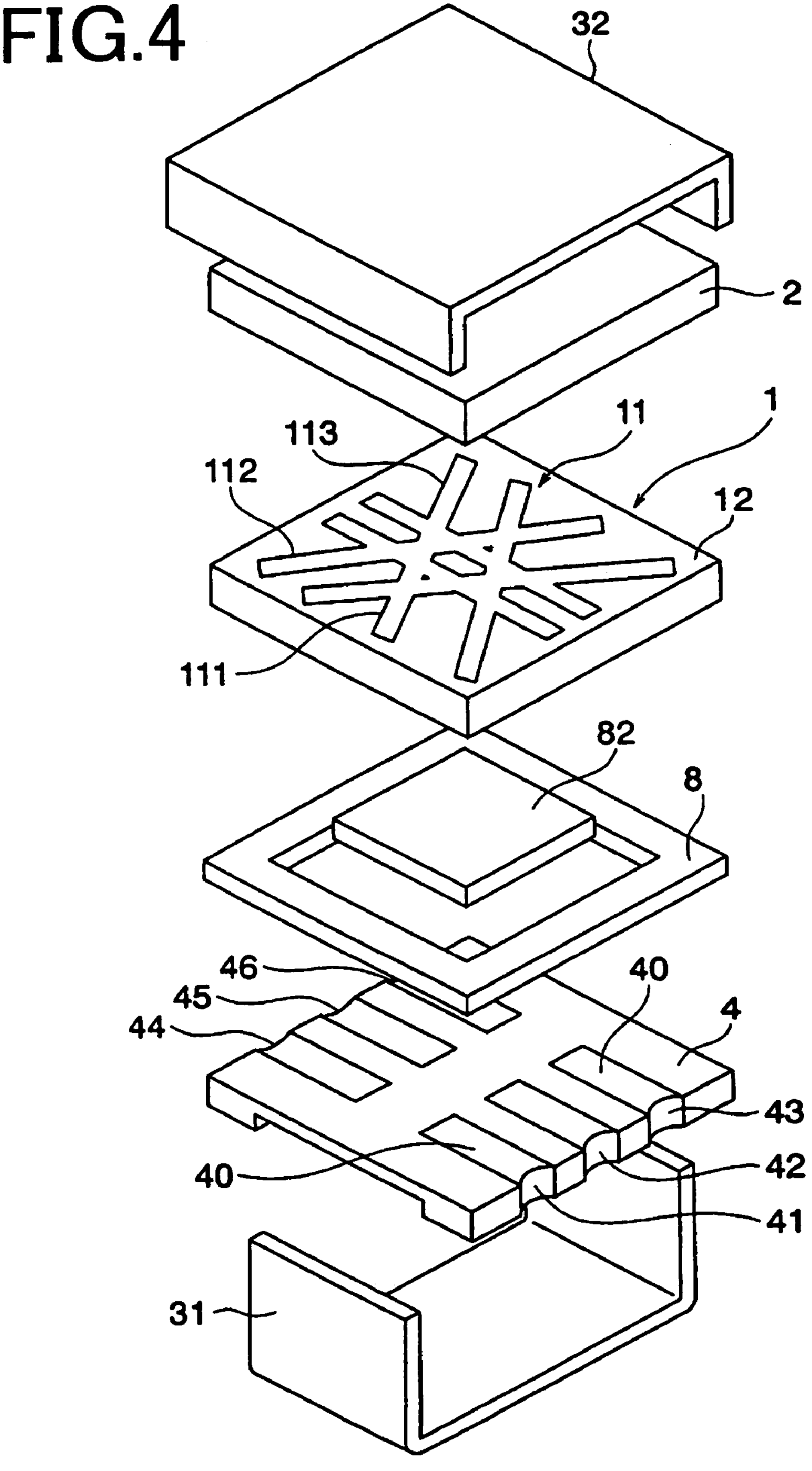
FIG. 4 is an exploded perspective view showing an example of a non-reciprocal circuit device manufacturing by applying the manufacturing method according to the present invention.

FIG. 4 is an exploded perspective view showing another example of the non-reciprocal circuit device obtained by the manufacturing method according to the present invention. In the drawing, like reference numerals denote parts corresponding to the constituent parts depicted in FIGS. 1 to 3, thereby eliminating the tautological explanation. The embodiment shown in FIG. 4 is characterized in a configuration of a gyromagnetic component 1. That is, the gyromagnetic component 1 has a configuration in which a center electrode 11 is formed as a conductor film on one surface of a soft magnetic substrate 12. Central conductors 111 to 113 constituting the center electrode 11 are insulated from each other by an inorganic or organic insulating film and formed on one surface of the soft magnetic substrate 12. When leading out the central conductors 111 to 113, a through hole technique or the like can be applied.

Additionally, an outer shape of the gyromagnetic component 1 is substantially the same as that of a permanent magnet 2. A plane outer shape of a support substrate 4 is also substantially the same as those of the gyromagnetic component 1 and the permanent magnet 2.

The gyromagnetic component 1 is joined to the support substrate 4 through a functional substrate 82 including capacitors and a terminating resistor required for a circuit configuration. In this example, as described above, it is good enough to fill a space with an insulating resin 8. It is not necessary to fill the entire space, and filling exposed surfaces alone with the insulating resin 8 can suffice. Further, a bonding function may be provided to the above-described insulating resin 8. In this case, it is possible to improve securing strength between constituent components, e.g., the permanent magnet 2, the support substrate 4 and the gyromagnetic component 1.

A manufacturing method of the above-described two types of non-reciprocal circuit devices will now be explained with reference to FIGS. 5 to 12. FIGS. 5 to 9 show a manufacturing method of the non-reciprocal circuit device depicted in FIGS. 1 to 3.

Figure 5:
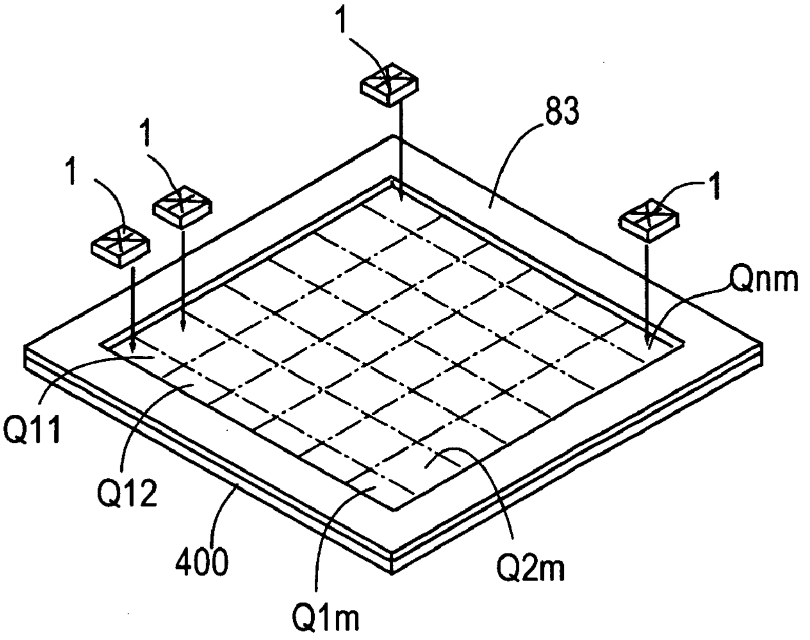
FIG. 5 is a perspective view illustrating the manufacturing method according to the present invention.
Figure 6:
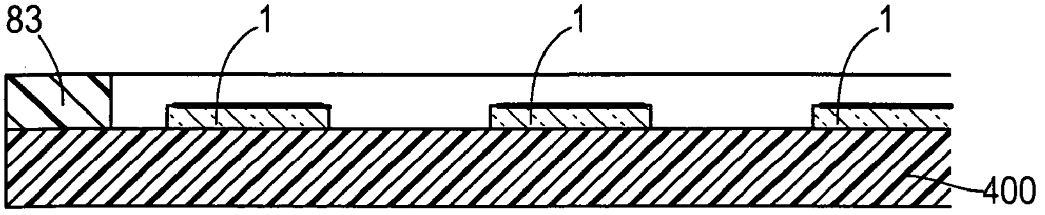
FIG. 6 is a partially enlarged cross-sectional view showing a step following a step depicted in FIG. 5.
Figure 7:
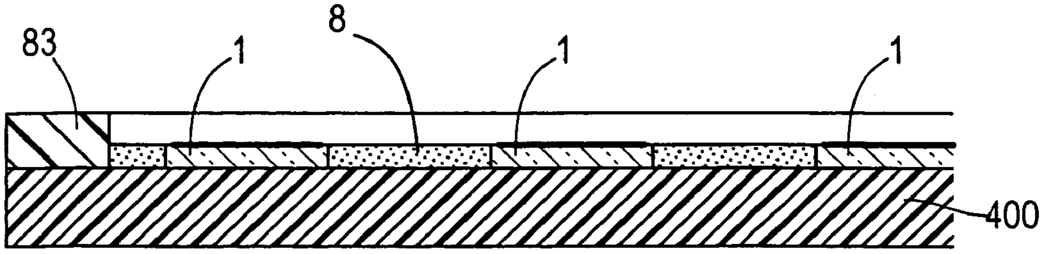
FIG. 7 is a partially enlarged cross-sectional view showing a step following the step depicted in FIG. 6.

First, as shown in FIGS. 5 to 7, a support substrate 400 on which many support portions Q11 to Qnm are arranged in a lattice-like form is manufactured, and a previously produced gyromagnetic component 1 is joined to each of the support portions Q11 to Qnm. Capacitors 51 and 52 and a terminating resistor 53 (see FIGS. 1 to 3) may be attached together with the gyromagnetic component 1. Furthermore, it is good enough to provide a frame portion 83 on an outer rim of the support substrate 400 in order to prevent an injected resin from leaking.

Figure 8:
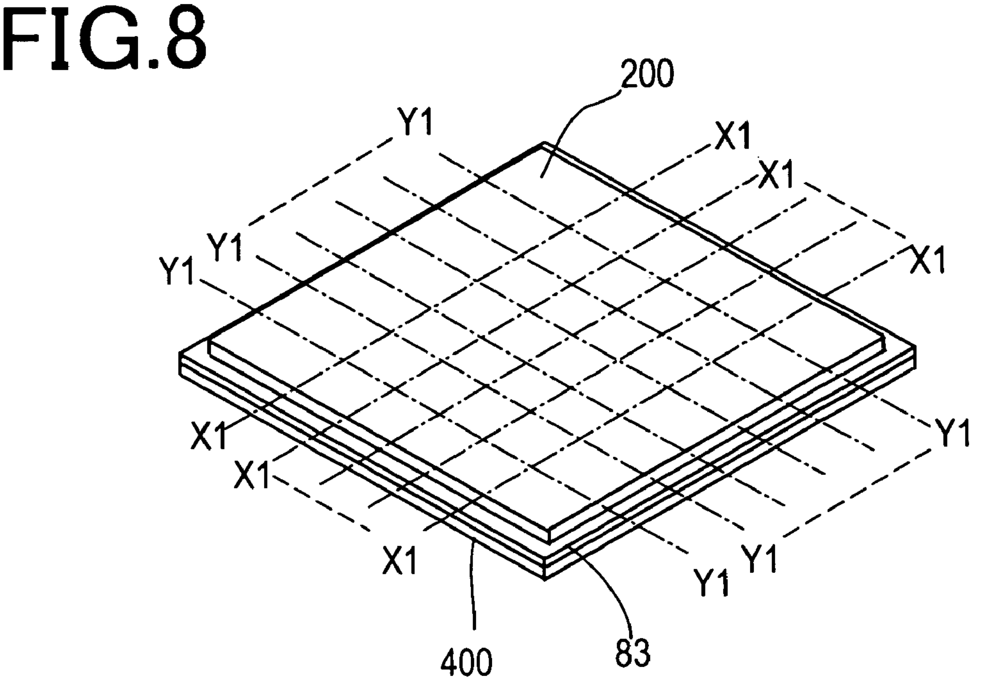
FIG. 8 is a partially enlarged cross-sectional view showing a step following the step depicted in FIG. 7.
Figure 9:
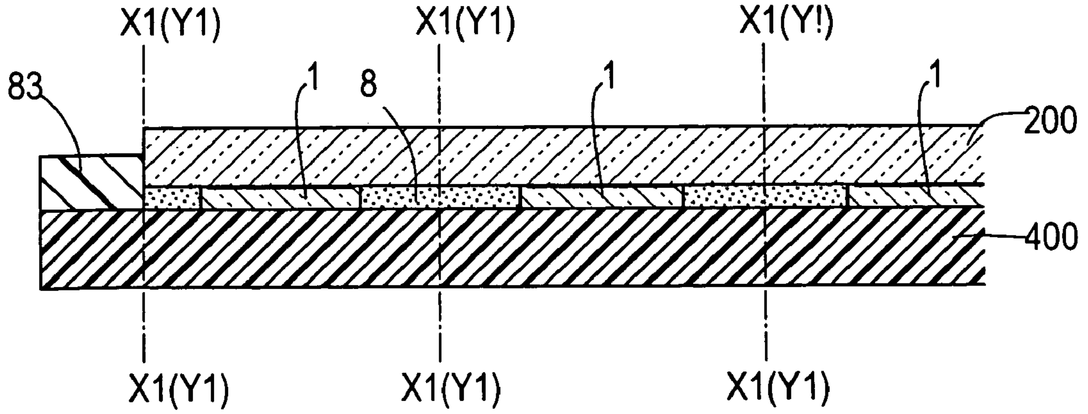
FIG. 9 is a partially enlarged cross-sectional view showing the step depicted in FIG. 8.

Then, an insulating resin 8 is injected around the gyromagnetic component 1 on the support substrate 400. Subsequently, as shown in FIGS. 8 and 9, a permanent magnet plate 200 is bonded. The permanent magnet plate 200 has a plane area which covers all the gyromagnetic components 1.

Then, as shown in FIGS. 8 and 9, the entire structure is cut along cutting-plane lines X1-X1 and Y1-Y1 in accordance with each gyromagnetic component 1. As a result, in the non-reciprocal circuit device depicted in FIGS. 1 to 3, each assembly including a support substrate 4, the gyromagnetic component 1 and a permanent magnet 2 can be obtained at a stroke. Thereafter, the non-reciprocal circuit device depicted in FIGS. 1 to 3 can be obtained by attaching a first yoke 31 and a second yoke 32. In a case where the insulating resin 8 is not used, an adhesive layer may be provided and bonded between contact surfaces of the gyromagnetic component 1 an the permanent magnet plate 200, and the insulating resin 8 may be applied on exposed surfaces after cutting the entire structure to obtain each assembly.

As described above, the manufacturing method according to the present invention improves efficiency of a manufacturing process of the support substrate by producing the support substrate 400 in which many support portions Q11 to Qnm are arranged in a lattice-like form. Additionally, this method assembles the gyromagnetic component 1 to each of the support portions Q11 to Qnm in this support substrate 400, further assembles the permanent magnet plate 200, then applies cutting processing, and thereafter takes out each non-reciprocal circuit device, thereby greatly improving mass productivity.

Figure 10:
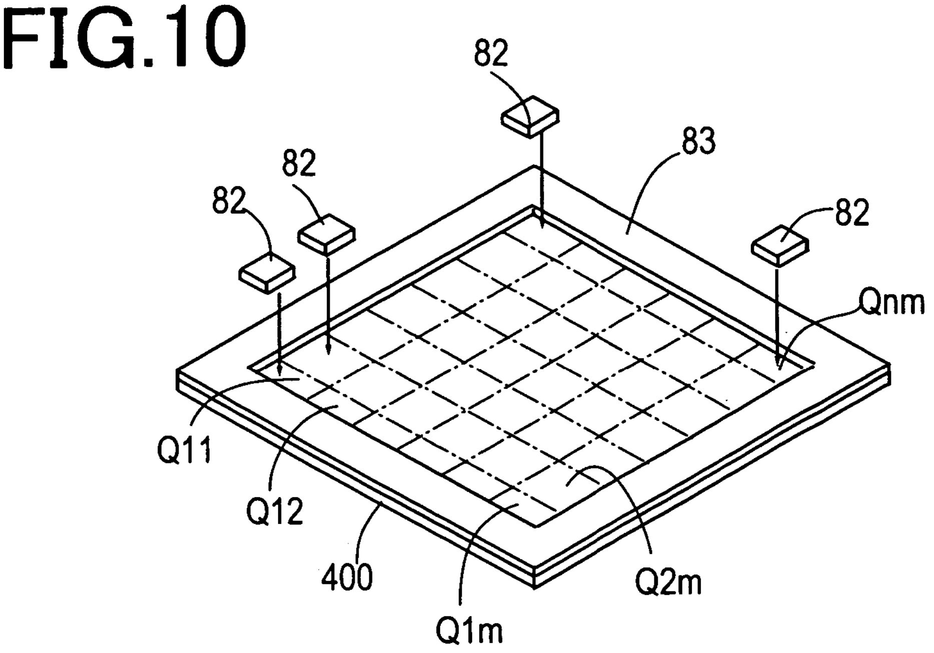
FIG. 10 is a perspective view showing another example of the manufacturing method according to the present invention.
Figure 11:
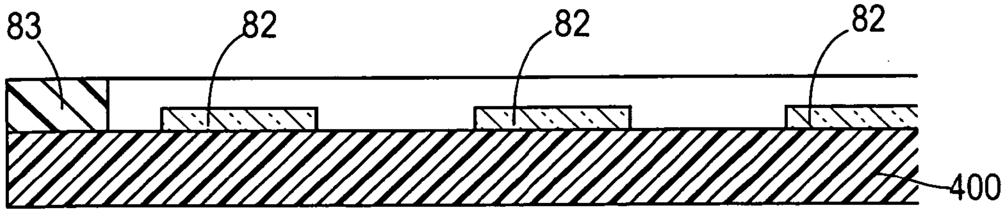
FIG. 11 is a partially enlarged cross-sectional view showing a step following a step depicted in FIG. 10.
Figure 12:
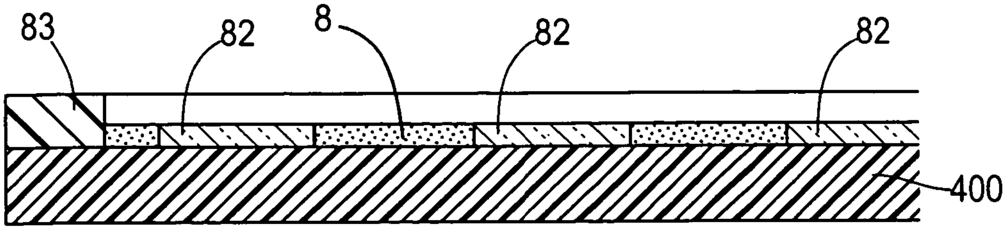
FIG. 12 is a partially enlarged cross-sectional view showing a configuration after the steps depicted in FIGS. 10 and 11.

FIGS. 10 to 15 show a manufacturing method of the non-reciprocal circuit device depicted in FIG. 4. First, as shown in FIGS. 10 and 11, a support substrate 400 including many support portions Q11 to Qnm for each non-reciprocal circuit device arranged in a lattice-like form is prepared, and a functional substrate 82 is arranged at a position corresponding to each of these support portions Q11 to Qnm. Then, as shown in FIG. 12, a space around each functional substrate 82 is filled with an insulating resin 8. It is preferable for the insulating resin 8 to have adhesion properties.

Figure 13:
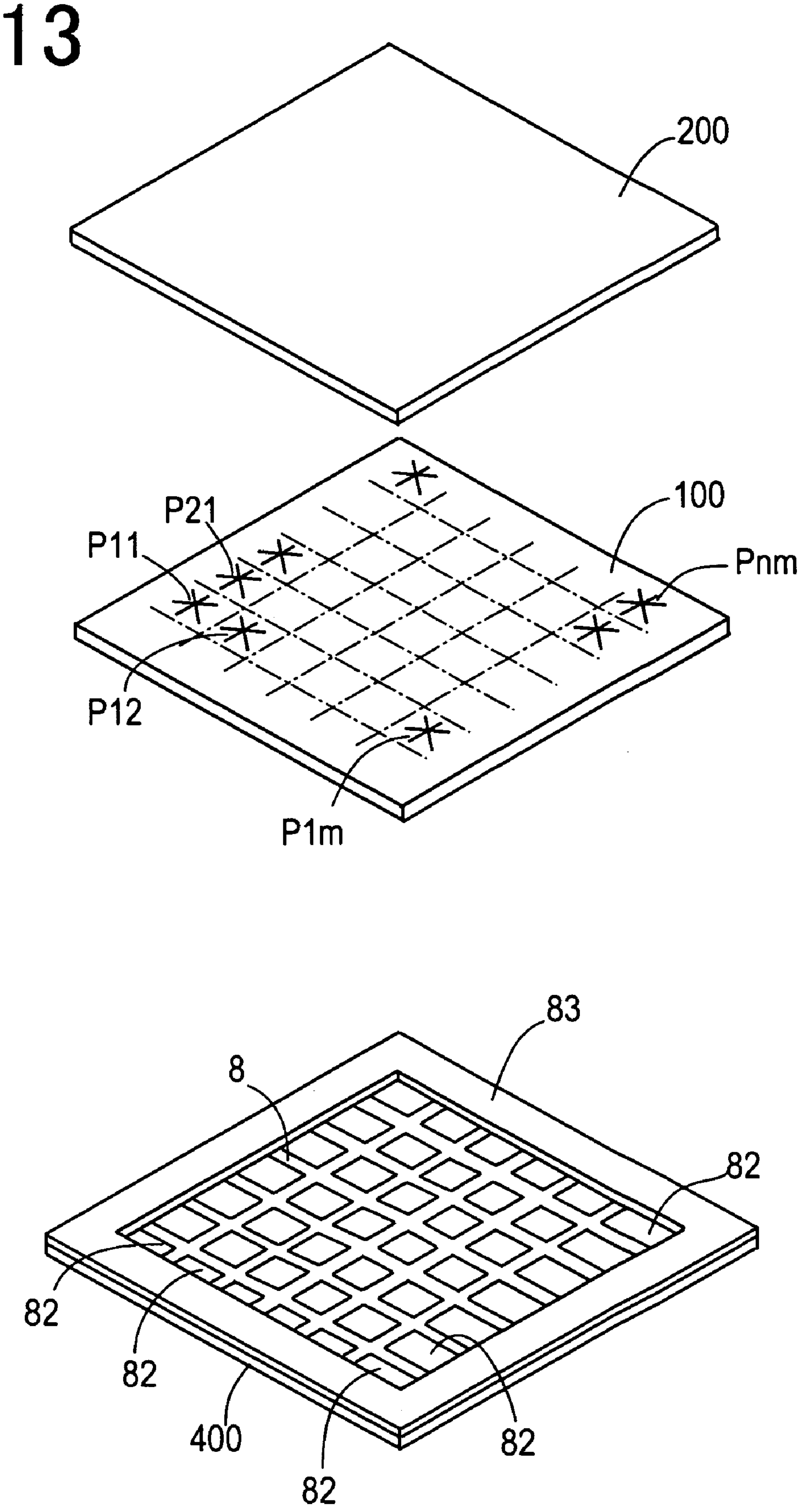
FIG. 13 is a view showing a step following the step depicted in FIG. 12.

Then, as shown in FIG. 13, a gyromagnetic component aggregate 100 is arranged on a group of the functional substrates 82 each of which is arranged at a position corresponding to each of the support portions Q11 to Qnm and on the insulating resin 8 filling the space around each functional substrate 82. Providing the adhesion properties to the insulating resin 8 can simultaneously fill the space and bond the support substrate 400 and the gyromagnetic component aggregate 100 with each other. It is good enough to provide a frame portion 83, which prevents the injected resin from leaking, on an outer rim of the support substrate 400.

The gyromagnetic component aggregate 100 includes many gyromagnetic component elements P11 to Pnm arranged in a lattice-like form. When superimposing the gyromagnetic component aggregate 100, each of the gyromagnetic component elements P11 to Pnm is associated with each of the support portions Q11 to Qnm.

Further, a permanent magnet plate 200 is arranged on the gyromagnetic component aggregate 100, and these members are bonded with each other by using an adhesive. The permanent magnet plate 200 has substantially the same outer shape as that of the gyromagnetic component aggregate 100.

Figure 14:
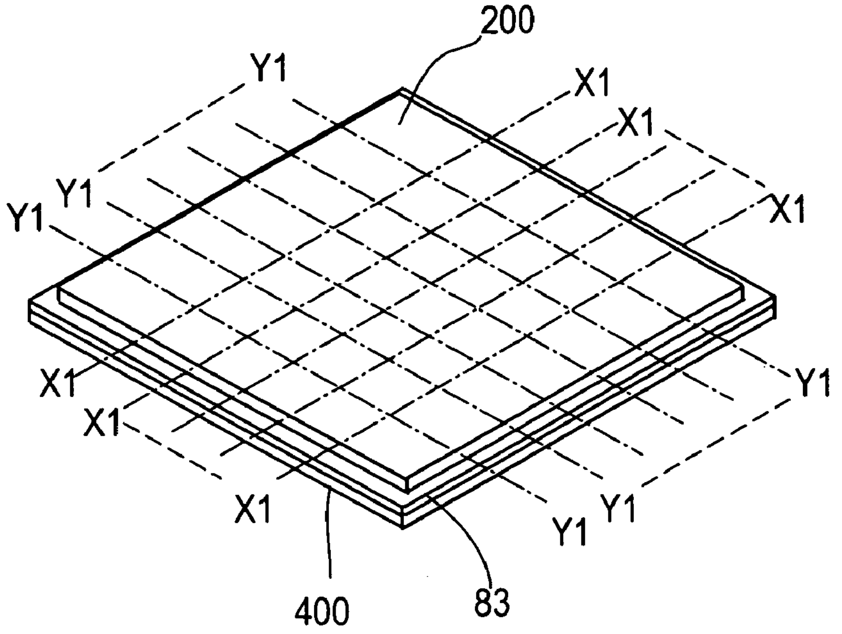
FIG. 14 is a view showing a step following the step depicted in FIG. 13.
Figure 15:
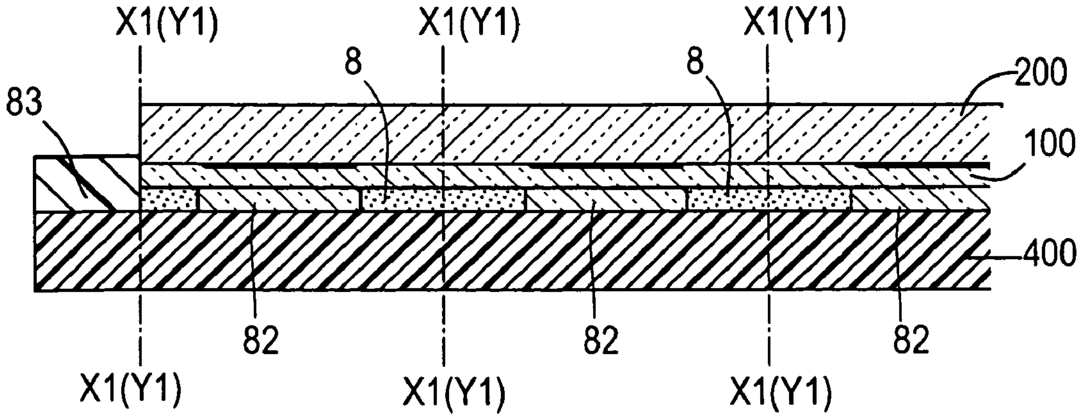
FIG. 15 is a partially enlarged cross-sectional view showing the step depicted in FIG. 14.

Then, as shown in FIGS. 14 to 15, the entire structure is cut along boundary lines X1-X1 and Y1-Y1 in accordance with each of the gyromagnetic component elements P11 to Pnm and the support portions Q11 to Qnm. Consequently, as shown in FIG. 4, it is possible to take out each assembly including a support substrate 4, a gyromagnetic component 1 and a permanent magnet 2. Then, the non-reciprocal circuit device shown in FIG. 4 can be obtained by attaching a first yoke 31 and a second yoke 32. In a case where the insulating resin 8 is not used, an adhesive layer may be provided between contact surfaces of the functional substrates 82 and the gyromagnetic component aggregate 100 so that these members are bonded with each other, and the insulating resin 8 may be applied on exposed surfaces after each assembly is obtained.

According to the manufacturing method shown in FIGS. 10 to 15, the support substrate 400 having many support portions Q11 to Qnm arranged in a lattice-like form and the gyromagnetic component aggregate 100 having many gyromagnetic component elements P11 to Pnm arranged in a lattice-like form are manufactured to improve efficiency of the manufacturing process of the support substrate and the gyromagnetic component. Furthermore, the permanent magnet plate 200 is superimposed on these aggregates 100 and 400, and cutting processing is applied to individually take out each assembly which serves as a non-reciprocal circuit device, thereby greatly improving mass productivity.

While the present invention has been particularly shown and described with reference to preferred embodiments thereof, it will be understood by those skilled in the art that various changes in form and detail may be made therein without departing from the spirit, scope and teaching of the invention.

What is claimed is:

1. A manufacturing method of a non-reciprocal circuit device comprising steps of:

arranging gyromagnetic components on one surface of a support substrate including many support portions for non-reciprocal circuit devices arranged in a lattice-like form therein in accordance with each of the support portions;

arranging a permanent magnet plate on the gyromagnetic components, the permanent magnet plate having a plane area which covers all the gyromagnetic components; and cutting the entire structure along boundaries of the respective gyromagnetic components and support portions to take out each assembly including a support substrate, the gyromagnetic component and a permanent magnet.

2. A manufacturing method of a non-reciprocal circuit device comprising steps of:

superimposing a gyromagnetic component aggregate including many gyromagnetic component elements corresponding to support portions arranged therein in a lattice-like form on a support substrate including many support portions for non-reciprocal circuit devices arranged therein in a lattice-like form;

arranging a permanent magnet plate on the gyromagnetic component aggregate; and cutting the entire structure along boundaries of the respective gyromagnetic component elements and support portions to take out each assembly including a support substrate, a gyromagnetic component and a permanent magnet.

* * * * *